United States Patent [19]

Jamieson

[11] 4,136,954
[45] Jan. 30, 1979

[54] IMAGING APPARATUS INCLUDING SPATIAL-SPECTRAL INTERFEROMETER

[76] Inventor: John A. Jamieson, 5306 Kenwood Ave., Chevy Chase, Md. 20015

[21] Appl. No.: 755,288

[22] Filed: Dec. 29, 1976

[51] Int. Cl.² .............................................. G01B 9/02
[52] U.S. Cl. ..................................... 356/349; 356/346
[58] Field of Search .......................... 356/106 R, 106 S

[56] References Cited

U.S. PATENT DOCUMENTS

| | | | |
|---|---|---|---|
| 3,556,630 | 1/1971 | Wilczynski | 350/3.5 |
| 3,975,629 | 8/1976 | O'Meara | 250/201 |
| 4,028,544 | 6/1977 | Jourdan et al. | 250/203 R |
| 4,064,535 | 12/1977 | Cross et al. | 358/113 |
| 4,067,009 | 1/1978 | Constant | 343/5 CM |

*Primary Examiner*—John K. Corbin
*Assistant Examiner*—Matthew W. Koren
*Attorney, Agent, or Firm*—Pollock, Vande Sande & Priddy

[57] ABSTRACT

Imaging apparatus for producing the image of a radiating object which exists in a noise-producing background, includes an optical transducer including a focal plane array or radiation detectors. Light collected by a partially filled entrance aperture is relayed to a partially filled focal plane array by relay optics which include one or more variable phase retardation devices. For example, two movable mirrors per dimension driven in push-pull by piezoelectric drives operate as phase shifters. Interference of incident light from separated parts of the entrance pupil at a series of path differences allows the initially distorted image to be dissected into a series of constituent images at several narrow wavelength intervals. The arrangement of the instrument is so chosen that each constituent image carries information about a different region of spatial frequencies. The set of constituent images carries a complete set of spatial frequencies out to a limit much larger than the area of the entrance pupil would ordinarily provide. The detectors in the focal plane are chosen to have a sufficiently wide spectral response to accept all these data. The detectors are arranged at spacings which sample the constituent images adequately for reconstruction. The data collected by the instrument are analyzed by Fourier transformation with respect to imposed path difference by interpolation of detect or samples and by weighting and summing of constituent images.

32 Claims, 28 Drawing Figures

U.S. Patent  Jan. 30, 1979  Sheet 1 of 7  4,136,954
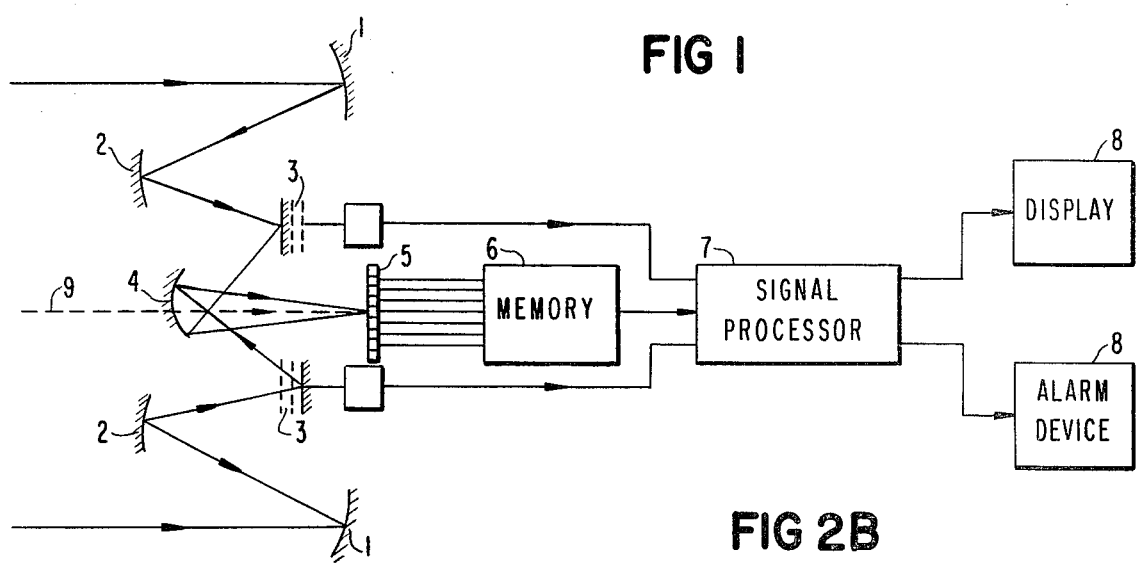
FIG 1
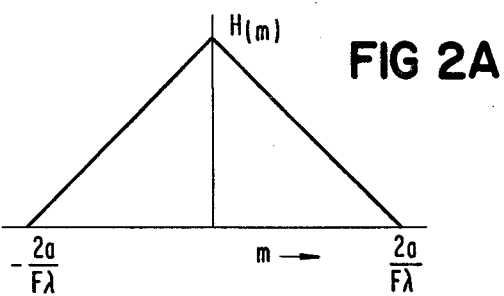
FIG 2A
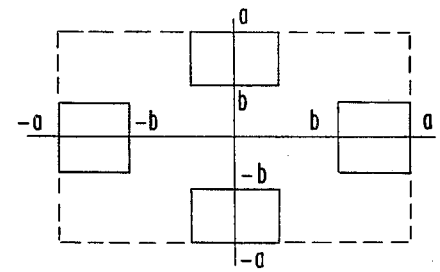
FIG 2B
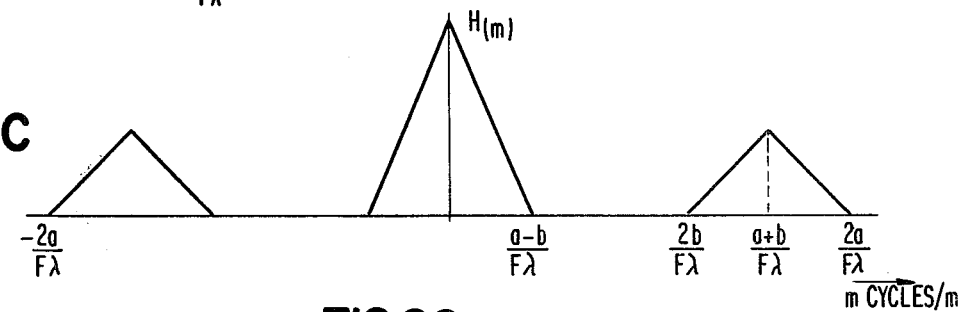
FIG 2C
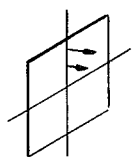
FIG 2D
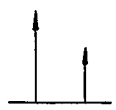
FIG 2E
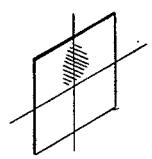
FIG 2F
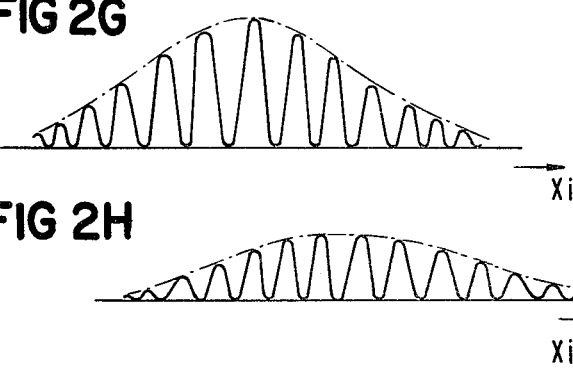
FIG 2G
FIG 2H
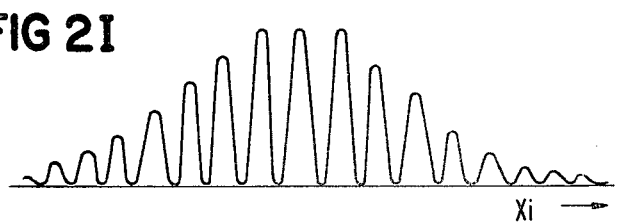
FIG 2I

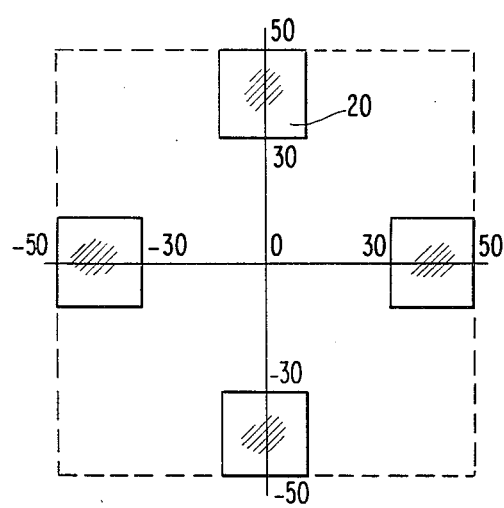
FIG 3 ENTRANCE PUPIL (DIMENSIONS IN CM.)
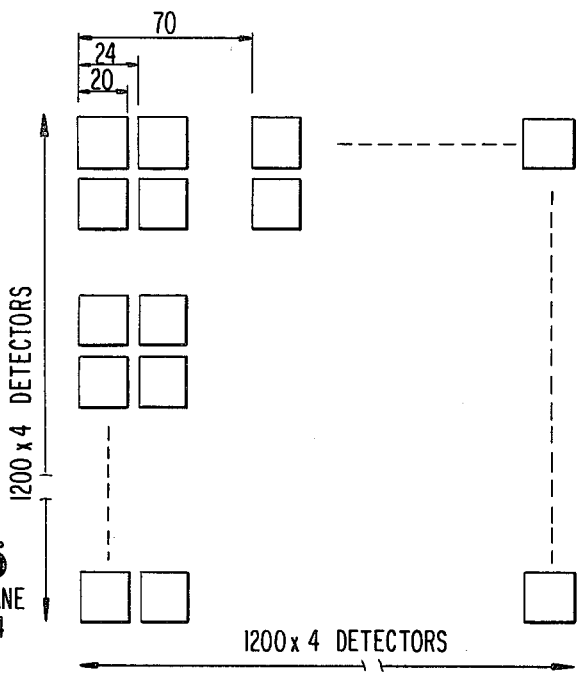
FIG 5 FOCAL PLANE ARRAY 24
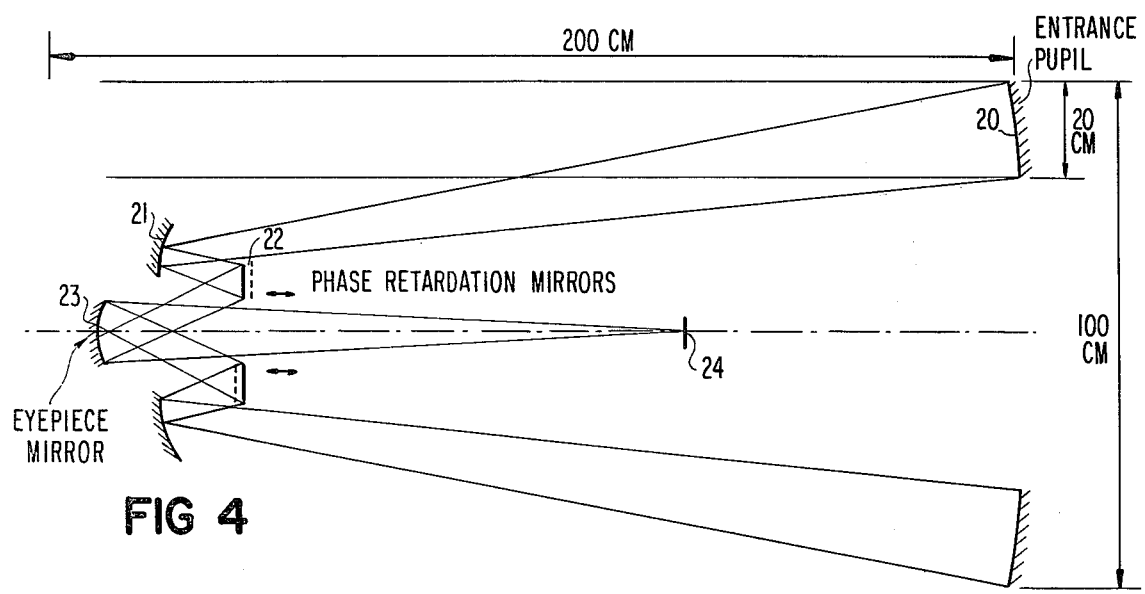
FIG 4
FIG 6 FUNCTIONAL BLOCK DIAGRAM
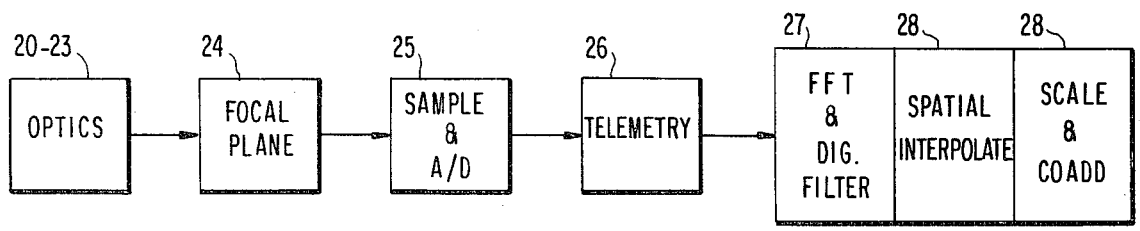

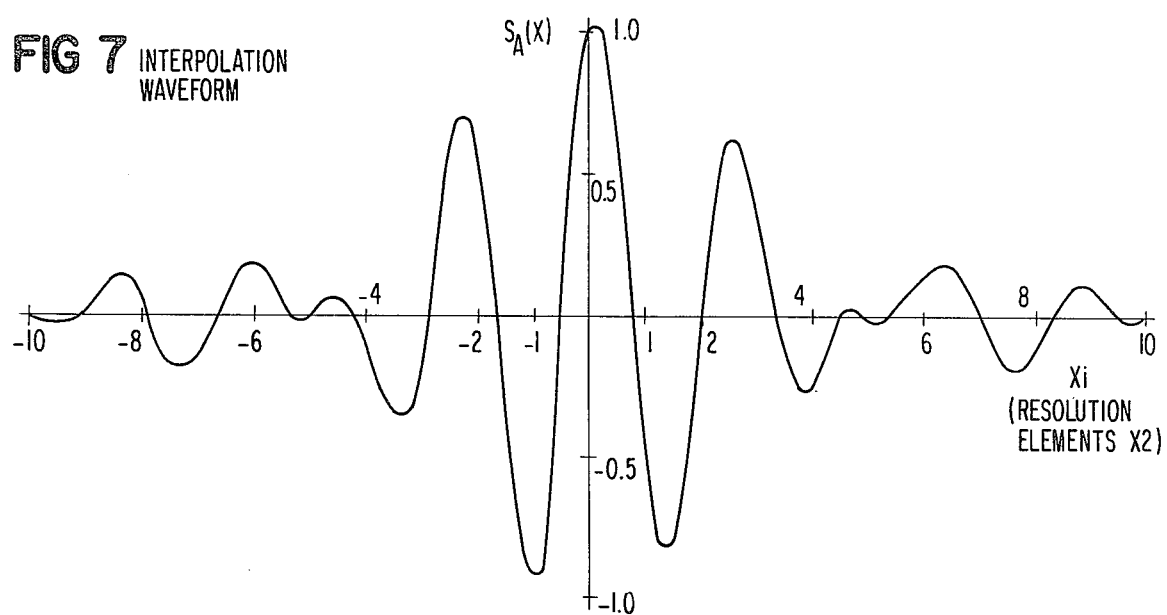
FIG 7 INTERPOLATION WAVEFORM
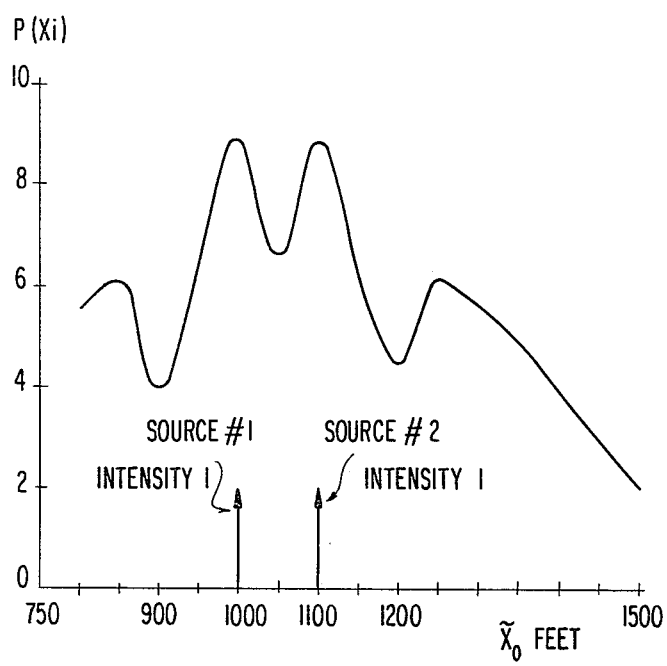
FIG 8 IMAGE OF TWO SOURCES
$S(\tilde{X}_0 - 1000) + S(\tilde{X}_0 - 1100)$
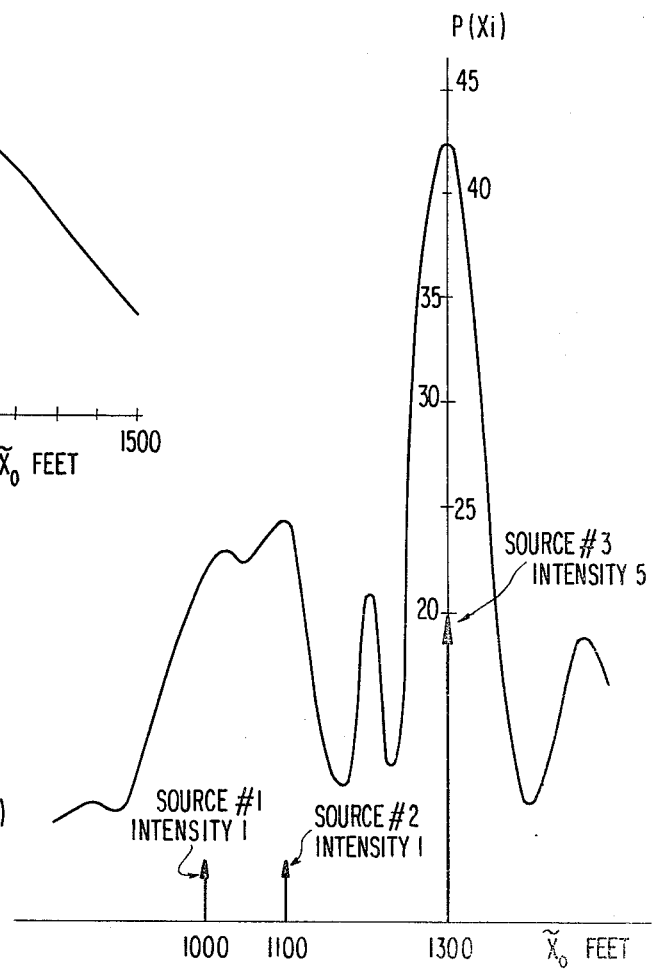
FIG 9 IMAGE OF THREE SOURCES
$S(\tilde{X}_0 - 1000) + S(\tilde{X}_0 - 1100) + 5S(\tilde{X}_0 - 1300)$

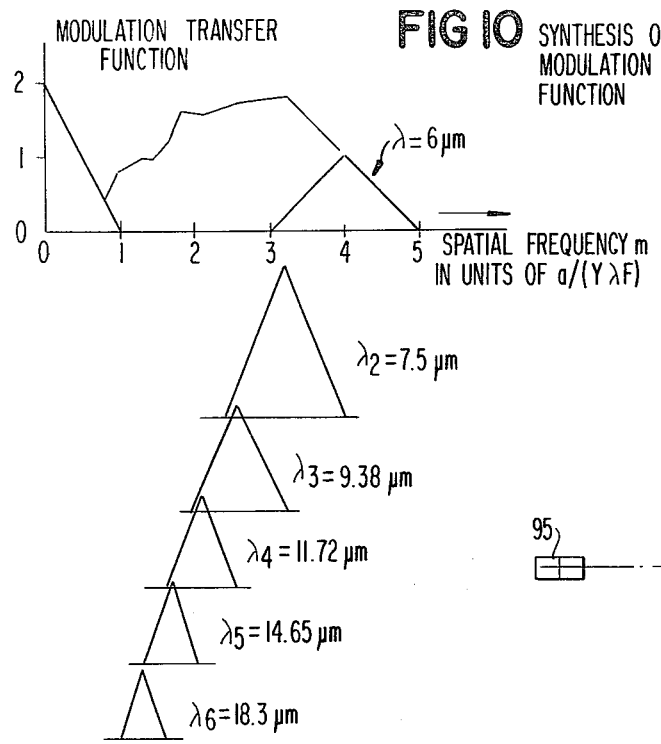
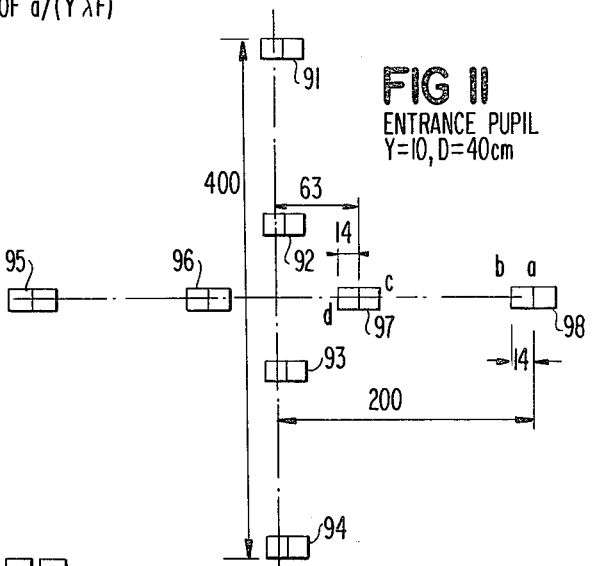
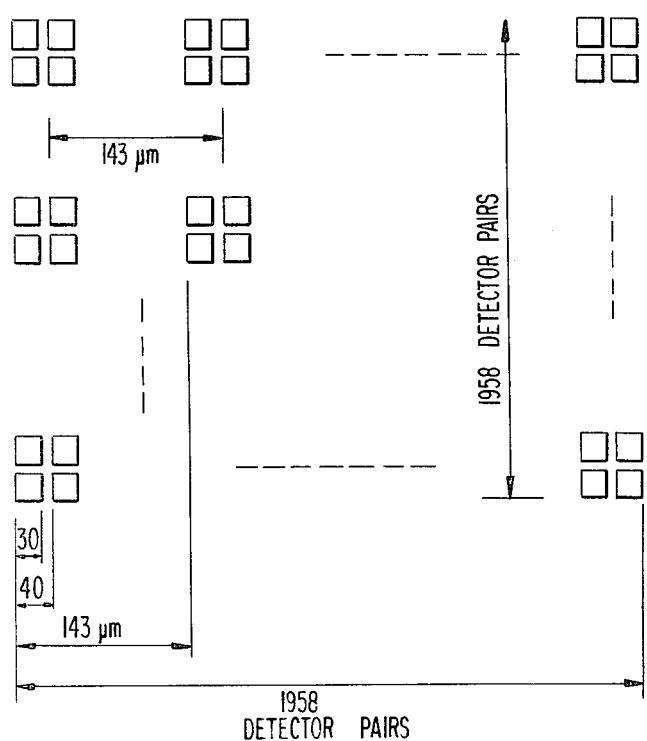
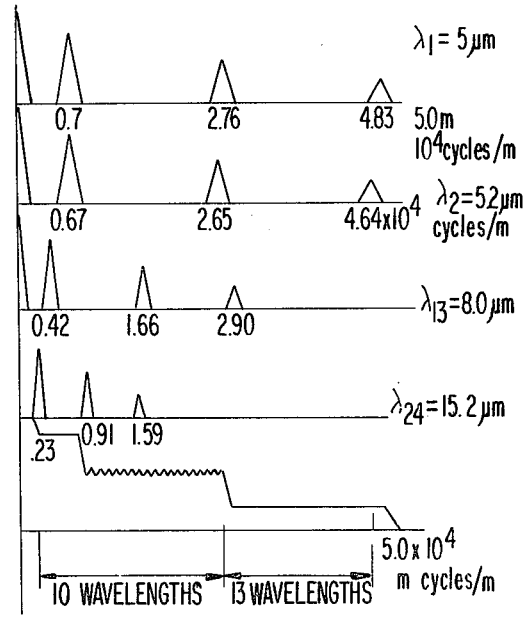
FIG 10 SYNTHESIS OF MODULATION TRANSFER FUNCTION
FIG 11 ENTRANCE PUPIL Y=10, D=40cm
FIG 12 DETECTOR ARRAY FOR Y=10, D=40cm & 8 APERTURES
FIG 13 MODULATION TRANSFER SYNTHESIS FOR Y=10, D=0.4m & 8 APERTURES

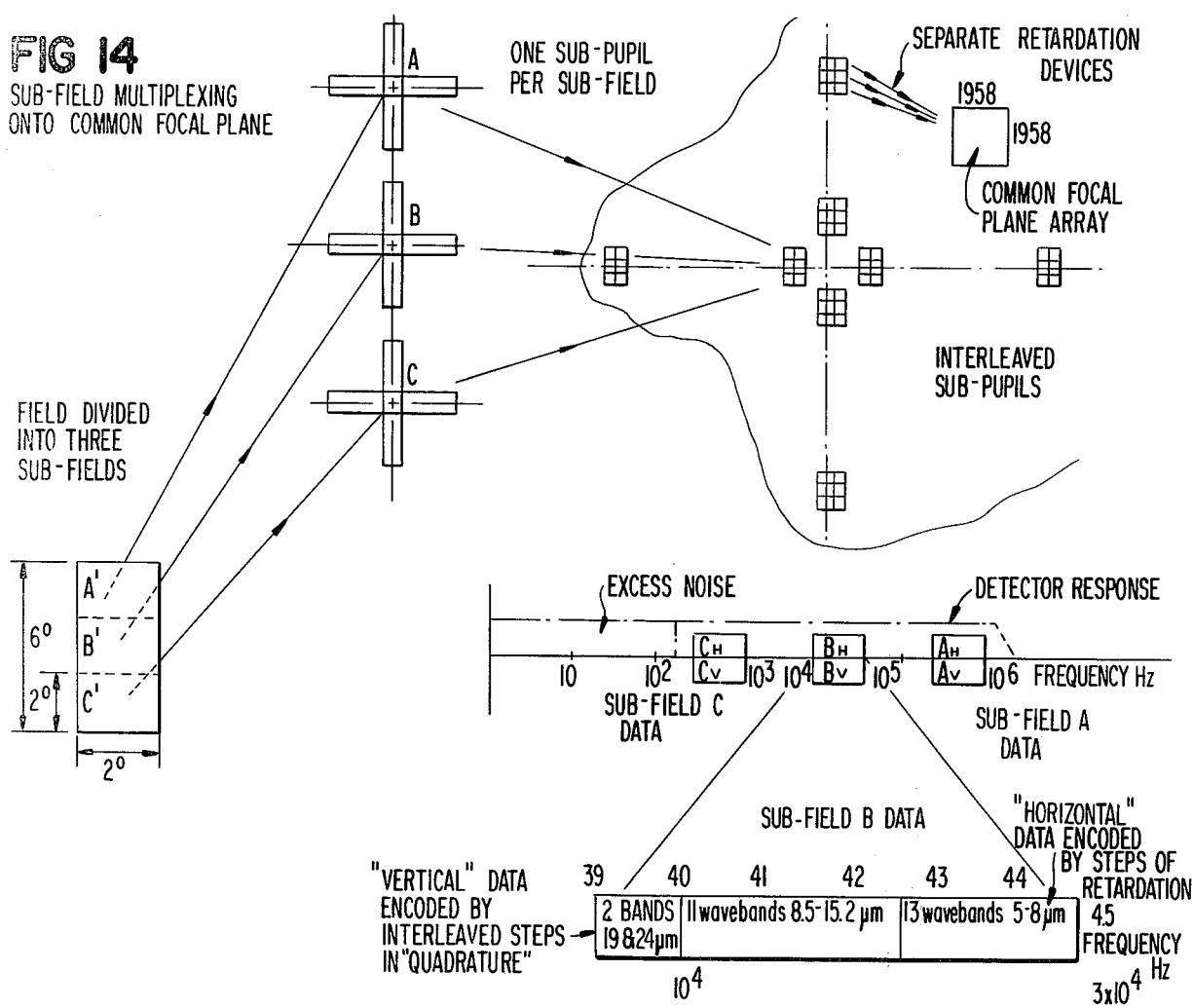
FIG 14
SUB-FIELD MULTIPLEXING ONTO COMMON FOCAL PLANE
FIG 15
FREQUENCY MULTIPLEXING FROM THREE SUB-FIELDS ONTO A COMMON DETECTOR ARRAY
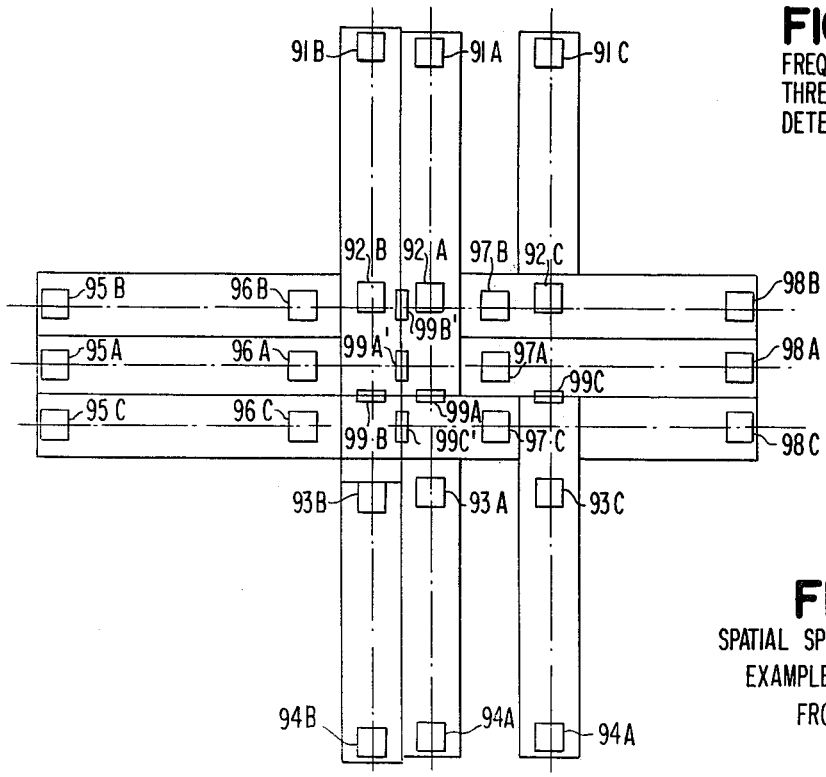
FIG 16A
SPATIAL SPECTRAL INTERFEROMETER
EXAMPLE $\gamma=10$   $D=40$ cm
FRONTAL ELEVATION

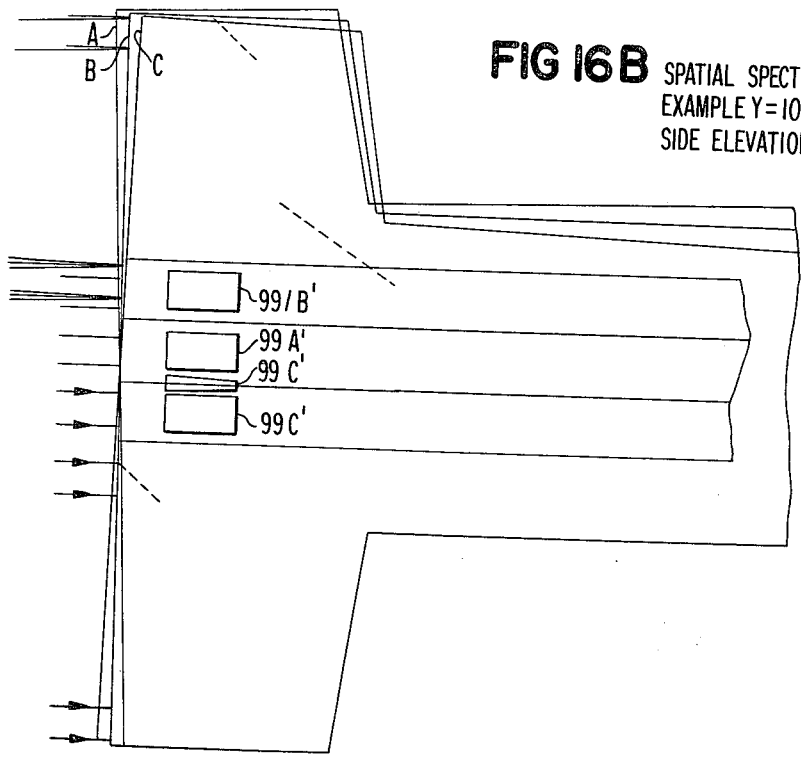
FIG 16B SPATIAL SPECTRAL INTERFEROMETER EXAMPLE Y=10, D=40cm SIDE ELEVATION
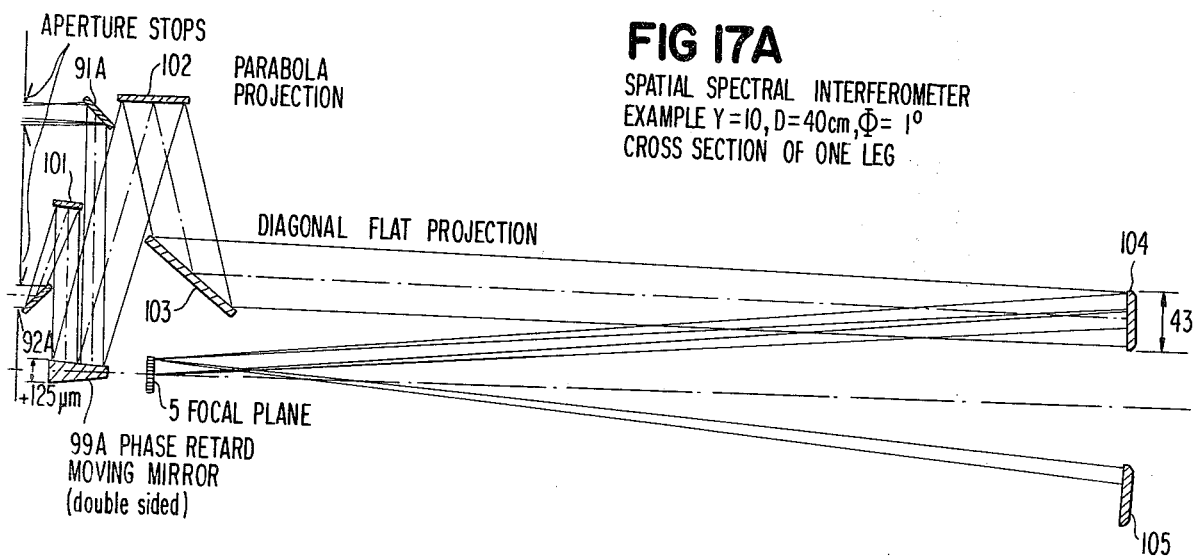
FIG 17A SPATIAL SPECTRAL INTERFEROMETER EXAMPLE Y=10, D=40cm, Φ=1° CROSS SECTION OF ONE LEG
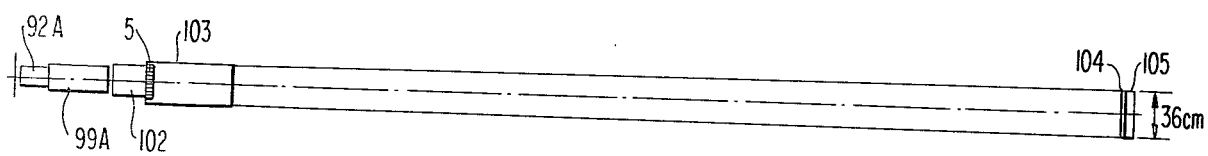
FIG 17B

IMAGING APPARATUS INCLUDING SPATIAL-SPECTRAL INTERFEROMETER

FIELD OF THE INVENTION

The present invention relates to object imaging, detecting, or locating apparatus or interferometer spectrometric apparatus responsive to electromagnetic radiation (such as infrared or visible light).

BACKGROUND OF THE INVENTION

It is well known in the art that the resolution of apparatus responding to electromagnetic radiation in the optical (or near optical) regions, can be improved by increasing the aperture. Likewise, the signal-noise ratio of the apparatus can also be improved by increasing the aperture. Furthermore, if the apparatus is to detect targets against an irrelevant background, then the ratio of target signal to background clutter may be improved by improving the resolution.

However, an increase in the size of the aperture results in an increase in the size and weight of the instrument with corresponding disadvantages; particularly the difficulty of mounting and transporting the apparatus. For example, if the apparatus is to be installed in a vehicle such as a space satellite, a missile or an aircraft where space is limited and where each kilogram of payload requires many kilograms of vehicle and propulsion, then size and weight are critical attributes having a great effect on the cost and practicality of the overall system. In some particular applications, no vehicle may be available which can accommodate the size of the aperture required for a particular mission. In such a case, the practicality and cost of the overall mission may be driven by the sensor requirement through development of a special vehicle or the use of extraordinary deployment techniques. In earth-bound applications, similar considerations apply. For example, in an astronomical application it may be desirable to limit the size of the apparatus which is traversed.

It is also well known in the art that the signal to noise ratio of optical instruments which must gather data on an image within a limited period of time can be improved by increasing the number of radiation detectors used to transduce the electromagnetic radiation to electrical signals. However, an increase in the number of such detectors entails similar disadvantages.

For reasons such as are briefly set out above, therefore, it has long been a goal in this art to obtain the ultimate performance from these instruments. The prior art evidences the use of a technique referred to as synthetic aperture which is believed to be useful in attaining high performance from instruments of this sort. In this regard, see the Meinel et al. article entitled "A Large Multiple Mirror Project", appearing in *Optical Engineering*, Volume 11, Number 2 (March/April 1972), pages 33–37, and the article by Meinel entitled "Aperture Synthesis Using Independent Telescopes", appearing in *Applied Optics*, Volume 9, Number 11 (November 1970), pages 2501–2504. In the latter article, the author defines aperture synthesis as "occurring when separate optical elements are combined with phasing to form a common image field in which the resolution is greater than that for a single element".

In 1890, A. A. Michelsen (Phil. Mag. (5), 30, 1) utilized two auxiliary mirrors to augment the effective diameter of the 100 inch telescope at Mount Wilson to increase its resolution for measuring the diameter of celestial objects. The two mirrors were moved laterally until the contrast of fringes in the pattern of interference of light from the two apertures was extinguished. The separation of the mirrors was then a measure of the diameter of the object.

J. S. Wilczynski, in U.S. Pat. No. 3,556,630, discloses a "Method and Apparatus for Obtaining, by a Series of Samples, the Intensity Distribution Across Sources of Incoherent Electromagnetic Waves to Produce a Single Composite Picture". He discloses how a desired "large" aperture area can be subdivided into a plurality of smaller apertures of equal size. The image that would be obtained by the "large" aperture is then derived using only a pair of the smaller apertures by physically relocating the pair of small apertures to a number of different positions.

However, due to the necessity for mechanically relocating the plurality of mirrors to a precision comparable to the wavelength of the radiation sensed, which requires moving substantial masses and which takes time, during which time the image must be fixed or substantially fixed, applications for this technique are limited.

From the foregoing it should be apparent that there is still a need to increase the ability to extract information from a given sized aperture or from an aperture of a given configuration and from a given array of detectors.

In recent work (see J. A. Jamieson, "Passive Infrared Sensors: Limitations on Performance", *Applied Optics*, Volume 5, page 891, April 1976), I have shown that a passive sensor gathers information in four dimensions of time, wavelength, and two angles, that frequently, information gathered in one dimension is not required to fulfill the mission of the sensor, but that the information acquired in another dimension is inadequate. A principal purpose of this invention is to allow information gathered in wavelength to be utilized to enhance information gathered in angle. That is, it is an object of the invention to use data measured by the apparatus which characterize the spectral distribution of radiance of a radiating scene to augment data measured on the scene in angle or location in the object surface. Another object of the invention is to provide apparatus which can be used adaptively for spectral resolution or spatial resolution beyond that ordinarily available or any intermediate combination of spectral and spatial resolution without the need to reconfigure the apparatus.

Another principal object of the invention is to provide apparatus which can yield spatial resolution beyond that ordinarily available from a given size of aperture. Another principal object is to provide apparatus which can measure an image of an object scene at a resolution beyond that ordinarily available from a given number of detectors. Another object is to provide apparatus in which the spatial response can be adjusted readily without the need to reconfigure the apparatus (e.g., to emphasize high spatial frequencies for edge sharpening or alternatively in the same instrument at another time to treat all spatial frequencies equally for best fidelity of response). Another object of the invention is to provide apparatus in which failure or degradation in performance of some of the detectors causes a minimum impact on the capability of the apparatus to yield a complete image.

A particular advantage of the invention is that the entrance pupil is incompletely filled so that other apparatus required for an overall mission in which this apparatus is used can be colocated with the entrance pupil or alternatively the entrance pupil can be distributed (e.g., on either side of the nose of a missile or on the wings of an aircraft) so as not to interfere with other functions of the overall system. Another advantage is that the radiation detectors in the apparatus are not required to fill the focal plane so that space remaining can be utilized for other functions such as electrical connections, pathways to remove heat, to minimize crosstalk, or for preamplifiers, charge-coupled devices, and other auxiliary electronic apparatus, or for redundant detectors.

Another advantage of the invention is that it provides an improved capability to discriminate a target object from a structured radiant background. This advantage results initially from the improved spatial resolution of the apparatus but is further enhanced if the target object has a different spectral distribution of radiance than the structured background.

A further advantage is that the invention reduces the need for accurate a-priori knowledge of target and background signatures before a system using a sensor is designed or committed to its mission. This advantage derives from the adaptive nature of the spatial/spectral response of the invention. This attribute allows the spectral response to be modified by reprogramming the data processing without reconfiguring the apparatus after the system is committed to its mission. If a mission should require the sensor to perform well against several kinds of targets at different times, the response can be successively altered an unlimited number of times rather than adopting an inferior fixed compromise response.

A further advantage is that the system designer can select the maximum dimensions of the entrance pupil independently of the collecting area of the entrance pupil so that he may select resolution and sensitivity independently to achieve a balanced, economical design.

SUMMARY OF THE INVENTION

The present invention meets these and other objects of the invention by providing apparatus which first collects and modifies incident radiation by optical and interferometric means and which subsequently transduces the received radiation (e.g., infrared, visible light, or other forms of radiation) to electrical signals and which further includes data storage means and signal processor to operate on the signals provided by the transducer to create data corresponding to an image with resolution increased above that which is normally associated with the aperture. The display apparatus, which can be a conventional display, can then be employed to display an image from the data generated by the processor or an alarm can be provided to be energized if the data corresponds to a target of interest.

One particularly significant aspect of the invention is the manner in which the radiation is sensed and collected. Electromagnetic energy is imaged, by a split or distributed aperture of predetermined size, spacing and orientation, onto a focal plane array of detectors. The path lengths from several parts of the aperture to the focal plane array are variable in a regular, periodic fashion. Interference effects produce a diffraction pattern at the focal plane which is a function of the optical path length. More particularly, the split aperture may include a plurality of symmetrically disposed aperture elements which can be thought of as plural pairs of aperture elements. The phasing of radiation received at the detector array from pairs of elements is adjusted to produce different diffraction patterns as a function of the phase adjustment. For example, the path lengths between different elements in a pair can be differentially varied. Since different path length variations produce different phase adjustments for different spatial frequencies, the variation of path lengths "encodes" different spatial frequencies allowing them to be separately detected. In this fashion, the array response can be analyzed with regard to the plural spatial frequencies of the incident radiation. Selected responses are recorded in a data storage device. Processing apparatus responds to the stored data and produces an image or image-like signal.

The present invention, therefore, relates to an image-forming method and apparatus, useful in the study of objects radiating, reflecting or otherwise transmitting spatially incoherent electromagnetic waves. The method and apparatus of the invention can be used or adapted in obtaining images of spatially incoherent electromagnetic radiation in astronomy, microscopy, remote sensing of earth resources and the like. The invention is further valuable where the size of the instrument is limited but resolution is an important characteristic. It would also be useful in quasi-imaging applications, such as surveillance, to detect unauthorized or hostile events. The invention would also be valuable in instruments based on earth for astronomy or surveillance of space.

The inclusion of signal processing means in the apparatus of the invention allows the invention to display an adaptive feature in which the same apparatus can be used to achieve a continuously variable mix of spatial and spectral resolution. More specifically, the signal processor can be instructed to generate a display having very fine spatial resolution at the expense of spectral resolution. On the other hand, the processor can also be instructed to resolve spectrally at the expense of spatial resolution. In one limit, the instrument can exhibit very fine spectral resolution, comparable to a Fourier transform interferometer at less than its potential spatial resolutions. At the other limit, the same apparatus can achieve very fine spatial resolution but no spectral resolution.

In one specific embodiment of the invention, wherein spatial resolution is enhanced at the expense of spectral response, the different array responses are processed so as to produce an image whose spatial resolution is greater than that available from the entrance aperture employing prior art techniques.

By changing the processing, the spectral and spatial resolution of the instrument can be varied to produce selected effects.

BRIEF DESCRIPTION OF THE DRAWINGS

The present invention will now be described in conjunction with the attached drawings, in which FIG. 1 is a schematic showing of the inventive apparatus, partly in block form, FIGS. 2A and 2C show Modulation Transfer Functions of various apertures, FIG. 2B illustrates an exemplary split aperture of simple form, FIGS. 2D-2I are schematic illustrations of a target, the response produced by individual components thereof, and different illustrations of the combined response, FIGS. 3-5 show a preferred embodiment of the entrance pupil, optical paths and detector array, FIG. 6 is a functional block diagram of operation of the invention;

FIG. 7 illustrates an interpolation waveform for a preferred detector array,

FIGS. 8 and 9 illustrate the responses to respectively two and three source targets, FIG. 10 shows the Modulation Transfer Function for this embodiment, FIGS. 11-13 relate to a second preferred embodiment and illustrate, respectively, the entrance pupil, the detector array and the Modulation Transfer Function, FIGS. 14, 15, 16A, 16B, 17A and 17B relate to a modification of the second embodiment illustrating respectively the relation between target, entrance pupil and detector array for subfield multiplexing, the frequency multiplexed spectrum at the detector, a plan view of the entrance pupil, a side view illustrating the relationship between entrance pupil, field of view and phase retardation devices, a detailed cross-section of the optical components of one leg and a side view thereof.

DETAILED DESCRIPTION OF THE INVENTION

Figure 18:
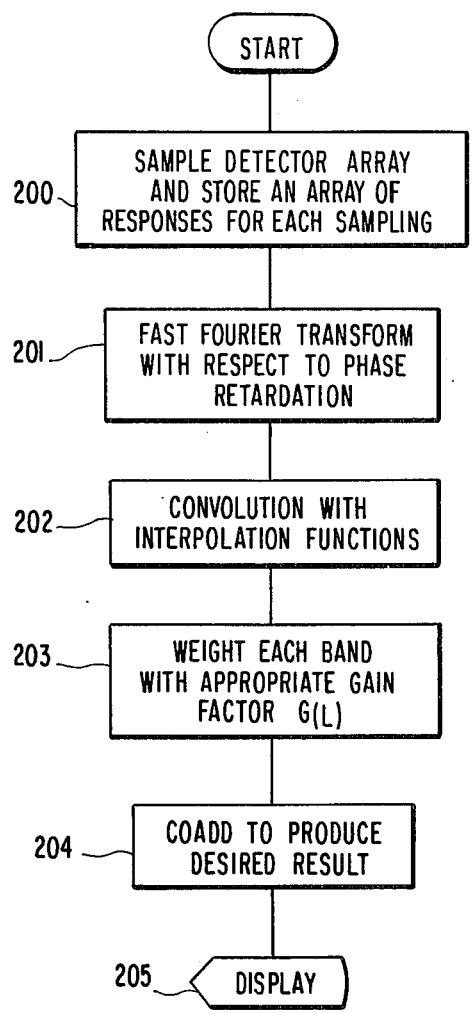
FIG. 18 illustrates the processing steps.

The present invention can employ various forms of electromagnetic radiation for detection or imaging of objects. Two illustrative examples will be disclosed herein employing visible or infrared devices. Those skilled in the art will understand that the form of the optics using mirrors and photoelectric detectors are specific to this example. Other forms of optics such as lenses and other forms of detectors would be appropriate to other regions of the electromagnetic spectrum and dimensions will depend upon the wavelengths of radiations used.

In general, the invention comprises six principal components illustrated schematically in FIG. 1. An optical train is provided for collecting and focussing the radiation (mirrors 1, 2 and 4). Phase retardation is implemented by relatively small, flat mirrors 3 translated back and forth by drive mechanisms such as a piezoelectric drive, electromagnetic drives, or lead screws forming a second component. The phase retardation device provides for varying the optical path length in a predetermined regular fashion. An array of radiation detectors such as photoconductive or photovoltaic or thermal radiation detectors 5 is a third component. A memory or data storage device 6, such as a charge-coupled device or an electronic memory, to retain the array of signals generated by each of the radiation detectors at the several positions of the phase retardation devices is a fourth component. A signal processor 7, the fifth component, is included to operate on the arrays of signals successively collected in the memory. This component may comprise a computer, a mini-computer, several microcomputers or a special purpose processor. A display 8 or alternatively, or in addition, an alarm device 8, if the apparatus is used in a warning or surveillance system is the sixth component. The display 8 may, for instance, be a conventional cathode ray display or a printer or other convenient device. The processor may include a decision making routine or threshold followed by an alarm 8 such as a light, bell, radio transmitter, etc., which provides an alarm signal if the device is used in a surveillance or warning system.

In some applications certain auxiliary equipment may be useful, including optical baffles to minimize interference by stray light; a laser source and a white light source to dynamically measure the phase differences from the apertures of the entrance pupil to the detector array; a programmer containing a fast clock to synchronize the motions of the phase retardation devices, the cycling of the memory, and the cycling of the signal processor and display; a calibration source as a reference when the device is used radiometrically; and a telemetry link if part of the signal processor and display are to be located remotely from the other parts of the apparatus. These auxiliary devices are not shown in FIG. 1.

The optical section of the apparatus receives the radiation transmitted both from the target to be detected as well as other radiating sources in its field of view. The optical elements comprise a plurality of mirrors for directing the received radiation to a planar transducer array 5. More particularly, the optical elements can comprise a first series of mirrors arranged in a substantially planar array, comprising the entrance pupil. Some of these mirrors are illustrated as mirrors 1 in FIG. 1. The radiation reflected from the several mirrors 1 is directed to a second plurality of mirrors 2 which recollimate the radiation and from them to a third plurality of flat or corner reflection mirrors 3. The mirrors 3 are capable of rectilinear motion along a path directed at an angle to the radiation reflected from the several mirrors 1 which path is parallel to the optical axis 9. The mirrors 3 then reflect radiation to a third plurality of mirrors 4 or a single eyepiece mirror 4 depending on the application. The radiation reflected by the several mirrors 4 is then imaged onto the detector array 5. Particularly significant to the invention is the motion of the plurality of mirrors 3, for this motion varies the optical path length in a predetermined manner for reasons which will be explained hereinafter. The field of view of the device may be limited by conventional baffles or the like, not illustrated.

Before describing two preferred embodiments in detail, the theoretical basis of the invention will be explained.

THEORY OF THE INVENTION

When an optical instrument with a continuous entrance pupil images a scene using electromagnetic radiation (for example, light) of wavelength $\lambda$, then details which subtend an angle smaller than $\lambda/D$, where $D$ is the maximum dimension of the entrance pupil of the instrument, will be blurred by diffraction. For example, if a telescope in a satellite uses a concave mirror 1m in diameter to image part of the surface of the earth with radiation of wavelength below 1 micron, then details subtending angles less than 2.44 micro-radians will not be distinct. If the range from the satellite to a point on the ground is 10,000 km. then details smaller than about 24 m. will be blurred. If it is necessary to resolve smaller details, the prior art teaches that the maximum dimension of the light-gathering aperture must be increased. If a larger complete mirror is used, the weight of the telescope will be increased. For most applications there may be practical upper limits to either weight or size that can be used.

It is well established (see, for example, M. Born and E. Wolf, *Principles of Optics*, Pergamon Press, 1959, chapter 10) that the blurring effects of diffraction for spatially incoherent light and object and image points distant from all points of the optics can be expressed mathematically by a convolution integral.

$$Q(\bar{x}_1, \nu) = \iint_\infty P(\bar{x}_0, \nu) K(\bar{x}_1 - \bar{x}_0, \nu) k^*(\bar{x}_1 - \bar{x}_0, \nu) d\bar{x}_0 \quad (1)$$

where $Q(\bar{x}_1, \nu)$ is the intensity in the image at the point $\bar{x}_1$ and at optical frequency $\nu$ resulting from the intensity of an object $P(\bar{x}_0, \nu)$ $\bar{x}_1$ is the typical image angle $\bar{x}_1 = x_1, y_1$
$\bar{x}_0$ is the typical object angle $\bar{x}_0 = x_0, y_0$
$d\bar{x}_0$ denotes the increment $d\bar{x}_0 = dx_0\,dy_0$ and the notation * denotes complex conjugate and the function $K(\bar{x}, \nu)$ is related to the shape of the telescope entrance pupil $G(\bar{\xi})$ by $$K(\bar{x}_1 - \bar{x}_0, \nu) = \nu^2 \iint_\infty G(\bar{\xi}) \exp\{-j2\pi\nu[(\bar{x}_1 - \bar{x}_0)\cdot\bar{\xi}]\} \quad (2)$$

Denoting the Fourier Transform of both sides of equation (1) with respect to x by the superscript $$\hat{Q}(\bar{m}, \nu) = \hat{P}(\bar{m}, \nu) \hat{H}(\bar{m}, \nu) \quad (3)$$

where H is the transform of KK*
$\bar{m}$ is a spatial frequency $\bar{m} = m_1, m_2$ reciprocal to $\bar{x}$ (i.e., if $x_1$ is measured in radians, $m_1$ is measured in cycles per radian). It follows from equation (2) (e.g., see Born and Wolf, page 525) that $$H(\bar{m} = \bar{\xi}/\lambda) = (1/\lambda)^2 \iint_\infty G(\bar{\xi}' + \bar{\xi}) G(\bar{\xi}) d\bar{\xi}' \quad (4)$$

which allows the function H to be evaluated very easily as the autocorrelation function of the entrance aperture for each wavelength $\lambda = 1/\nu$. Employing this relation in prior art devices is difficult since the transducer array does not separately respond to different spatial frequencies.

The optical apparatus which is the subject of this invention is arranged so that the light in the image can be separated into a number of spectral intervals or bands. These intervals are nearly monochromatic; that is, the difference between the largest and smallest wavelength is much less than the mean wavelength. For each interval a relationship of the form of equation (3) will hold.

The entrance pupil $G(\bar{\xi})$ is divided into two or more parts separated from each other so that the largest distance between the boundaries of the aperture is increased. This design offers a potentially great spatial resolution for the area (and weight) of the aperture, but because a portion of the aperture is missing, the function KK* is a complicated multilobed function.

More specifically, a square aperture of length 2a on a side has the transfer function H(m) whose cross-section is shown in FIG. 2A. Contrast this with the cross-section of the transfer function shown in FIG. 2C related to the split aperture shown in FIG. 2B, see J. Goodman, *Fourier Optics* (McGraw Hill). The significance of the different transfer functions will now be illustrated.

FIG. 2D shows an exemplary object or target with two radiation sources and FIG. 2E is a cross-section of the target schematically showing the two radiation sources and their relative amplitudes. With an entrance pupil of the form of FIG. 2B the image will have the form of FIG. 2F. This image is ambiguous in that several locations of the two targets might be inferred from it, only one pair of which are correct (and if the number of targets were unknown further incorrect inferences could plausibly be made). FIGS. 2G and 2H show the image contribution from the sources x and y, respectively, and FIG. 2I illustrates the superposed result. Thus, the image produced by the optics at each quasi-monochromatic band is blurred by convolution with an ambiguous function which makes it difficult to interpret. This difficulty is expressed in equation (3) by the fact that the function H is zero over the middle part of its range, see FIG. 2C.

A part of the product $\hat{P}\hat{H}$ making up the function $\hat{Q}$ is missing. Therefore, an inverse Fourier Transformation of the function $\hat{Q}$ does not yield a satisfactory image. If the optical transfer function $\hat{H}(m, \lambda_1)$ were known at $\lambda = \lambda_1$, for $|m| \leq 2a/F\lambda$ and if the transform of the distorted image $\hat{Q}(m, \lambda_1)$ were observed for $|m| \leq 2a/\lambda_1 F$ then the transform of the true image P(m) could be found from $$\hat{P}(m) = \hat{Q}(m, \lambda_1)/\hat{H}(m, \lambda_1)$$

and the true image could be found from $$p(x) = \int_{-B}^{B} \exp(j2\pi mx) \hat{P}(m) dm$$

where $B = 2a/\lambda_1 F$
However,
$H(m, \lambda_1) < \epsilon$ (an arbitrarily small quantity) for some regions of m, e.g., $$\frac{a-b}{F\lambda} < |m| \leq \frac{2b}{F\lambda}$$

$$\hat{Q}(m, \lambda_1) < \hat{Q}_0 \epsilon; \frac{a-b}{F\lambda} < |m| \leq \frac{2b}{F\lambda}$$

where $\hat{Q}_o = \hat{P}_o\hat{H}_o$, the value at m = o but the observations are only known to finite accuracy because of noise and measurement accuracy $$\hat{Q}(m, \lambda_1) = \hat{Q}(m, \lambda_1) \pm O(\epsilon) \begin{cases} & |m| \leq \frac{a-b}{F\lambda} \\ \{2b/f\lambda < & |m| \leq 2a/F\lambda_1 \end{cases}$$

$$\hat{Q}(m, \lambda_1) < \hat{Q}_o\epsilon \frac{a-b}{F\lambda_1} < |m| < \frac{2b}{F\lambda_1}$$

Therefore, the estimate $\tilde{P}(m)$ of $\hat{P}(m)$ is indeterminate in some regions of m. If the value of $\hat{Q}$ is taken to be zero in these regions, then the estimate $\tilde{p}(x)$ of the image $$\tilde{p}(x) = \int_{-B}^{B} \exp(jz\pi mx) \hat{p}(m) \left[1 - U(m; \frac{2b}{F\lambda}, \frac{a-b}{F\lambda})\right] dm$$

where $\hat{U}(m; \frac{2b}{F\lambda}, \frac{a-b}{F\lambda}) = \begin{cases} 1 \frac{a-b}{F\lambda} < |m| < \frac{2b}{F\lambda} \\ 0 \text{ elsewhere} \end{cases}$ The transform of $\hat{U}(m)$ is proportional to sinc $$\{2\pi(\frac{3b-a}{F\lambda})x\}\cos\{2\pi(\frac{a+b}{F\lambda})x\}$$

The convolution of this multilobed function with the true image p(x) is subtracted from the true image as a distortion.

But $\hat{H}(m, \lambda_1) = \hat{H}(m\,\lambda_1)$ for example for an entrance pupil with two elements per dimension (the pupil of FIG. 2B)

$$G(\epsilon) = 1\; b < |\epsilon| \leq a\; \hat{H}(m, \lambda_1) =$$

$$\frac{1}{C}\; \frac{4(a-b)}{2\pi\lambda_1 F}\left[\Lambda\left\{\frac{F\lambda_1 m}{2\pi(a-b)}\right\} + \right.$$

$$\frac{1}{2}\Lambda\left\{\frac{F}{2\pi(a-b)}(m\lambda_1 + \frac{(x-b)}{\lambda_1 F})\right\}$$

$$\left. + \frac{1}{2}\Lambda\left\{\frac{F}{2\pi(a-b)}(m\lambda_1 - \frac{(a+b)}{\lambda_1 F})\right\}\right]$$

where F is the focal length of the optics following the aperture $\Lambda$ is the triangle function $$\Lambda(\theta) = \begin{cases} 1 - |\theta| & |\theta| \leq 1 \\ 0 & \text{elsewhere} \end{cases}$$

If the source radiates (or transmits, etc.) energy at several quasi-monochromatic wavebands $\lambda_1, \lambda_2, \ldots \lambda_n$ then a new multispectral transfer function may be formed $$\hat{H}_s(m, \lambda) = A_1 \hat{H}(m, \lambda_1) + A_2 \hat{H}(m\,\lambda_2) + \ldots + A_n \hat{H}(m\,\lambda_n)$$

where it is further assumed that the additional wavelengths available are longer than the preferred wavelenth $\lambda_1$ $$\lambda_1 < \lambda_2 < \lambda_3 \ldots < \lambda_n$$

and the quantities $A_1, A_2 \ldots A_n$ are constant gain factors by which the components at the several wavebands are multiplied before they are combined.

If the quasi-monochromatic wavebands available from the source cover an adequate span of wavelengths at sufficiently small separation and adequate intensity then the gain constants $A_i$ can be chosen so that $\hat{H}_s(m, \lambda)$ is sufficiently great in the region $|m| < 2a/\lambda_1 F$ so that $\hat{P}(m)$ and subsequently $p(x)$ can be estimated properly. For example, for the aperture of FIG. 2B with area $4(a-b)^2$ to achieve resolution equivalent to a single continuous aperture of area $4a^2$ at the shortest available wavelength $\lambda_1$ is an improvement in linear resolution $$\gamma = a/(a-b)$$

This requires that the centers of two halves of the small aperture be displaced by $a + b = (2\gamma - 1)$ The number of quasi-monochromatic wavebands required is $$n \geq 1 - \log(2\gamma - 2)/\log\{(2\gamma - 1)/2\gamma\}$$

where n must be interpreted as the integer next larger than the quantity on the right and their proportions must be $$\lambda_2/\lambda_1 = 2\gamma/(2\gamma - 1)$$

$$\lambda_3/\lambda_1 = \{2\gamma/(2\gamma - 1)\}^2$$

$$\lambda_n/\lambda_1 = \{2\gamma/(2\gamma - 1)\}^{n-1}$$

(If the span of wavelengths available from the targets is less than $\lambda_n - \lambda_1$ then the aperture must be divided into more sections than two and these multiple sections should be arrayed with their centers at constant ratios.)

For the $\gamma$-enhanced, two-segment aperture, the gains may be arranged to be in the ratios $$A/A_1 = \{\gamma - (\gamma - 2)\frac{(2\gamma - 2)^{n-2}}{2\gamma}\}/\lambda_n;\; n = 2,3\ldots n$$

(This arrangement of gains will yield small minimum-side lobes. Since the different gain ratios also apply to different bands of spatial frequencies, advantage may be taken of their selection to provide spatial pre-emphasis such as edge enhancement.)

These provisions correct the effects of the missing part of H. However, a further difficulty arises because the distorted image data Q(x) are not observed continuously but only at discrete intervals $\Delta x$ corresponding to discrete detectors. This can be overcome by using a completely filled detector array. However, advantages accrue from using an incompletely filled array.

In the case of the $\gamma$-enhanced, two-element aperture, the spatial bandwidth accommodated at the shortest wavelength $\lambda_1$ is $4(a-b)/(F\lambda_1)$ in each dimension so that a field X can be reconstructed to arbitrary accuracy from $F\lambda_1$, $X/4(a - b)$ samples although the samples shall be arrayed in two evenly spaced sequences displaced by a fixed amount as described by Linden (in Proc. IRE, p. 1219, July 1959). Thus, an array of $\{F\lambda_1 X/4(a - b)\}^2$ detectors is required. It will, of course, be noted that the corresponding single aperture would require $(\gamma/2)^2$ as many detectors for the same field. Since each spatial bandpass is narrower than the preceding one by a factor $(2r-1)/2r$, the same number of samples is sufficient for each wavelength.

Since all the spatial frequencies within the bandwidth of the distorted image at each wavelength can be reconstructed, therefore, the multispectral estimate of the true image can also be reconstructed. A sufficient method would be to perform the reconstruction specified by Linden and perform the following operations on the resulting continuous function.

The key to employing the relationships derived above to obtain a $\gamma$ enhanced resolution is the ability to differentiate the responses to the several wavelength bands, $\lambda_1, \lambda_2$, etc.

This is achieved by employing the phase retardation mirrors 3 which, in effect, "code" the detector responses as a function of phase retardation.

DESCRIPTION OF A PREFERRED EMBODIMENT

A. REQUIREMENT

A sensor is required to resolve 100 feet at 3000 nmi over a field of 2° square. The application will support a sensor weight corresponding to an aperture area of 40 cm × 40 cm. The targets to be sensed radiate strongly at wavelengths from 6 to 20 μm.

B. DESCRIPTION

An aperture of 40 cm at 6 μm can resolve only about 275 feet at 3000 nmi. Therefore, the available aperture is divided into four parts, each comprising an identical mirror 20, each 20 cm × 20 cm spaced 90 cm on centers as shown in FIG. 3. The total aperture area is thus $4(20)^2 = (40\text{ cm})^2$. Photons gathered by this entrance pupil are reflected to four small off-axis parabaloids 21, FIG. 4, and from them as nearly collimated beams to four flat mirrors 22. These flat mirrors are used as differential phase retardation devices. They are translated as pairs in push pull (e.g., by piezoelectric drives or the equivalent). The "horizontal" pair are translated at one frequency; the vertipair at another.

The photons reflected from these phase shifters are reflected by an eyepiece 23 to a partially filled matrix array of detectors in focal plane 24. The detector array (shown in FIG. 5) can be considered as four doubly periodic arrays superimposed. Each array has 1200 20 $\mu$m detectors per dimension spaced at 70 $\mu$m. The total number to cover a field 2° × 2° in a staring mode is $(4800)^2$. (The usual staring sensor would require an aperture 100 cm × 100 cm and an array of $(6000)^2$ detectors.)

Alternatively, this sensor could be used as a scanning sensor with a linear array of 2400 detectors.

The photoelectric currents generated by the detectors are sampled 6k times (k times per band) as the phase retardation mirrors are translated through each cycle. These samples are digitized, (telemetered, if desired) and processed by a digital computer, as shown in the functional block diagram of FIG. 6. More specifically, the optics 20-23 provide signals to the focal plane array 24. These signals are sampled and A/D converted at 25. Telemetered, if desired to a remote location at 26. The digitized samples are then processed as shown 27-29. The computer output is a display of the entire 2° × 2° field to a spatial resolution of 6 $\mu$radians (100 feet at 3000 nmi) or alternatively, a set of 3k displays to a spatial resolution of 15 $\mu$radians to 50 $\mu$radians of the scene at wavelengths from 6 to 20 $\mu$m.

To illustrate the processing steps, assume only two spatial frequency bands (1 $\mu$m and 3 $\mu$m) are of interest, at a single detector in the array and a pair of apertures are of interest. Further, assume that the phase retardation device is capable of a total travel of 30 $\mu$m in a time period of 1 sec. Assuming 1 $\mu$m light from the apertures were in phase at the detector prior to movement of the phase retardation device, then the irradiance from each aperture would reinforce at the detector of interest. After $\frac{1}{4}$ $\mu$m equivalent phase shift, produced by $\frac{1}{8}$ $\mu$m movement of the mirrors, since they operate in push pull, there will be cancellation of the 1 $\mu$m radiation at the same detector. The next $\frac{1}{4}$ $\mu$m of phase shift again produces reinforcement. For phase retardation of 30 $\mu$m per second this results in a 240 Hz signal at the detector. The 3 $\mu$m radiation, at the same detector, will produce a 80 Hz signal. If the detector was coupled to 240 Hz and 80 Hz filters, the filters would provide signals, respectively related to the 1 $\mu$m and 3 $\mu$m contribution of the source from that detector. Although use of such means is entirely possible, it is much more convenient to sample the detector response, store the samples in a memory array, such as a CCD or electronic memory array and arrange a digital processor to perform a digital filtering function. Were the phase retardation devices moving at a constant rate, the sampling of the detectors could be accomplished on a time basis. However, to overcome any spurious modulation introduced by nonconstant motion of the phase retardation device, a laser is arranged to direct a narrow collimated beam onto an ear 3' integral with the mirror 3. The laser reflection from the mirror ear 3' impinges on a laser detector located for this purpose. The laser frequency and separation from the laser detector are selected so that mirror motion through selected distances results in either peaks or zero crossings of the laser detector response. The laser detector response is then used to trigger the sampling of the detector array 5.

Accordingly, the processing first takes the 6k samples at each detector and performs a Fourier transformation with respect to phase retardation. This step separates 3k spectral contributions to the detector signal. If a single image with 6 $\mu$radian resolution is required without spectral resolution, these 3k spectral components are digitally filtered to 6 wavelength bands. The result is a separate array of detector responses at each spatial frequency desired. Each array includes detector responses from each detector in the array. However, since the detector array is only partially filled, the response array at each spatial frequency is incomplete. The response array is filled using the methods disclosed by Linden, supra. Thus, the second step is to interpolate the apparent intensity at locations between the detectors. (This is necessary because only a partially filled detector array has been used, see FIG. 5, to economize on cost of detectors, electronics, and integration.) The interpolation is performed at each wavelength using a digital representation of the interpolation waveform shown in FIG. 7. If a completely filled detector array is available, of course, it can be substituted for the detector array shown in FIG. 5, and the interpolation processing procedure may be eliminated.

When interpolation is completed (if used) the result is a response array for each spatial wavelength band. In those cases where image reconstruction is not necessary, for example, in a surveillance system, these response arrays can be compared with a typical response of a target. If the arrays compare with the typical target signature, then an alarm 8' may be enabled. On the other hand, if image reconstruction is desired, each spatial response array is multiplied by a suitable gain factor, (for example, gain factors which are inversely proportional to spatial frequency) and the modified response array are then co-added. The resulting single array can drive a visual display 8, such as a printer, plotter or CRT to display a visual image. As a still further example, the gain factors can be selected to be proportional to spatial frequency. The result will emphasize high spatial frequencies and provide an edge sharpened visual display. Thus, in the final step response arrays at each wavelength are multiplied by gain factors which adjust the desired spatial response by apodizing (or edge sharpening, or smoothing, etc.) and co-added. The composite image may then be displayed.

C. SMALL SOURCE RESOLUTION

FIG. 8 shows a calculated example of the performance of this spatial spectral interferometer. The figure shows a cross-section of the intensity of the image resulting from two sources equal in intensity, much smaller than 100 feet, 100 feet apart at 3000 nmi. It will be seen that the two sources are resolved.

FIG. 9 shows a calculated result for the image of three small sources. Two of these are equal in intensity and 100 feet apart; the third is five times as strong and 200 feet separated.

D. SPATIAL FREQUENCY RESPONSE

The synthesized spatial frequency response used for these calculations is shown in FIG. 10. The response could be better apodized by further optimization.

SECOND PREFERRED EMBODIMENT

The spatial resolution of the FIG. 3 40 cm × 40 cm aperture can be increased by using either a wider span of wavelengths or a more complex entrance pupil. For example, if it were necessary to achieve a spatial resolution of 1.25 μradian at 5 μm (a ten-fold resolution improvement, $\gamma = 10$), the entrance pupil could be made of eight apertures, four in each dimension, as shown in FIG. 11. In this case the longest wavelength band would be about four times longer than the shortest so that the detectors would be chosen for 5 to 20 m. The focal plane and transfer function synthesis are shown, respectively, in FIGS. 12 and 13.

In addition, we can increase the field of view, from 2° × 2° to 2° × 6°. Apertures 91, 92, 93 and 94 are located collinearly and apertures 95, 96, 97 and 98 are also collinear, on an axis perpendicular to the axis of apertures 91–94 using three interleaved apertures schematically shown in FIG. 14. The field is divided into three 2° × 2° subfields shown as A', B', C', in FIG. 14. A Spatial Spectral Interferometer designed for 2° × 2° is pointed at each subfield. The three entrance pupils, A, B, C, are then interleaved in one composite entrance pupil. The axes of the three subpupils are tilted at 2°, 0° and −2° from the central axis of the optics to the center of the 2° × 6° total field.

Radiation signals from the three subfields are modulated by three pairs of retardation devices operating at three different frequencies and multiplexed on a single common array of detectors which can be the array shown in FIG. 12. The time frequency multiplexing pattern for a typical detector is shown in FIG. 15. The steps of translation of the phase retarder for the "horizontal" apertures in each subpupil are interleaved in the time intervals between the steps of translation of the "vertical" apertures so that the two dimensions are coded in quadrature. The phase shifters for the three subfields are driven at 450 cm/sec 15 cm/sec, and 0.5 cm/sec, respectively.

The number of detectors required is $4(1958)^2$, whereas the number required for a usual staring sensor design would be $$3\left\{\left(\frac{2\pi}{180}\right)/1.25 \times 10^{-6}\right\}^2 \sim 3(28,000)^2.$$

Thus, the number of detectors is reduced by a factor of 150 and furthermore the resulting arrangement is convenient for modular construction as shown in FIG. 12 and allows easy access for connections, removal of heat, cold shielding, to minimize crosstalk, and for other engineering reasons.

FIGS. 16A–B and 17A–B show, in detail, the layout of the optical components. FIG. 16A is a scaled front elevation for the three entrance pupils showing the relationship of the entrance apertures 91–99 and the phase retardation devices 9. The apertures are numbered to correspond to FIG. 11 with the addition to the letters A, B or C to differentiate components associated with the three subfields A, B and C. In this embodiment, a single wedge shaped moving mirror 99 is mirrored on both sides to serve the same function as the pair of mirrors 3, shown in FIG. 1. Each subfield has two wedge shaped phase retardation devices 99 and 99'. The drives for the phase retardation devices are not illustrated for ease in reading the drawings.

FIG. 16B is a side elevation illustrating the tilting of the optical components to triple the angle of view, in one dimension.

FIG. 17A is a scaled cross-section of one of the four legs of one of the three SSI's shown in FIGS. 16A–B. Associated with each entrance aperture mirror 91A and 92A are aperture stops to limit the entrance apertures. Radiation reflected from mirror 91A is reflected to the phase retardation mirror 99A and from there to a parabolic reflector 102, to a flat mirror 103, to flat mirror 104 and from there to the detector array 5 in the focal plane. Parabolic reflector 102 is the only optical element which has optical power to provide for focusing the radiation at the focal plane 5. Likewise, radiation reflected from aperture mirror 92A is reflected to flat mirror 101, to wedge shaped moving mirror 99A, to parabolic reflector 102, etc. The two path lengths from the aperture plane to the mirror 99A are arranged to be equal. Corresponding aperture mirrors 93A and 94A, have their phase adjusted by the position of the mirror 99A, although employing the other mirrored surface. The horizontally oriented (in FIG. 16A) apertures use still another phase adjustment device 99A', and not illustrated optical components, similar to those illustrated to focus radiation received thereby onto the same focal plane array 5.

PROCESSING

Although the processing carried out by the apparatus has been explained, it is believed worthwhile to summarize the several steps in connection with FIG. 18 which shows the steps and their sequences.

The data set taken consists of a series of samples taken by the detectors as the phase retardation is varied, for example as the mirrors move in the phase shifters. Each data point is the voltage generated by a detector at a particular phase retardation corresponding, for example, to the position of a moving mirror. The complete array of detectors, doubly periodic in each of two dimensions, takes sufficient samples of the irradiance pattern so that the band limited spatial pattern at each wavelength can be reconstructed exactly. The complete set of samples taken by every detector as the moving mirror passes through its complete travel is sufficient to separate all the required quasi-monochromatic wavebands. In each dimension there are 2M detectors in two sequences of M detectors and each detector sees 2N irradiances (i.e., samples) as the mirror changes position. The voltages are sampled and digitized to an array (function 200):

$$V(I, K) = V_A(IA, K) + V_B(IB, K)$$

where
IA = 1, 3, ... 2M−1

IB = 2, 4, ... 2M

K = 1, 2, ... 2N

In both dimensions are a similar four dimensional array.

The first step (function 201) of processing is a fast Fourier transform with respect to K which recover the wavelength dependence of irradiance at each detector.

$$Y(I, L) = \frac{1}{2N} \sum_{K=1}^{2N-1} V(I, K) \cos 2\pi \frac{KL}{2N}$$

The spectral decomposition may then be applied to a series of digital filters which shape the quasi-monochromatic bands.

In function 202, a pair of interpolation waveforms is each convolved with the data from each row of detectors in each spectral band to reconstruct the response at intermediate points between the locations where detectors took samples. For example, at band LC (where LC is one of the quasi-monochromatic bands)

$$ZA\ (IA,\ LC) = \sum_{J=1}^{2M-1} YA(J,\ LC)\ SA(J - IA,\ LC)$$

$$ZB\ (IB,\ LC) = \sum_{J=2}^{2M} YB(J,\ LC)\ SB(IB - J,\ LC)$$

$$Z(I, LC) = ZA(IA, LC) + ZB(IB, LC)$$

where SA and SB are the respective interpolation functions.

The interpolation functions are the digitized forms of those previously described. The interpolation function for the different bands have the same form, but different scale.

The functions Z (one for each band) are each multiplied by the gain factors specified for their wavelengths (function 203) and co-added (function 204) by rows (and columns) to reconstruct the multi-spectral image $$V\ \text{IMAGE}\ (I) = \sum_{LC=1}^{D} G(LC)\ Z(I, LC)$$

where D is the last of the quasi-monochromatic bands.

As explained above, the gain factors may be varied to suit the application. If desired, the data array produced by function 204 may be displayed (function 205) on any conventional display, CRT, plotter, etc. Alternatively, or in addition, the data array produced at function 204 may be compared with a stored array corresponding to a target of interest. If the arrays compare, to within suitable limits, an alarm or similar device may be energized to signal detection of a target of interest.

All the steps of Fourier transformation (FFT), digital filtering, convolution with interpolating functions, weighting and adding are standard routines which can be performed in a general purpose computer remote from the sensor proper or in special purpose smaller computers or hardwired processors directly associated with the sensor.

Since the processor is capable of separately handling the response of each detector in the array still further flexibility accrues. For example, it is known that present day detectors do not always exhibit completely identical characteristics. Where desirable, a pair (or more) of detector responses may be averaged to reduce the undesirable variance in detector response characteristics. The presence of the processor allows this decision to be made even after the sensor has been manufactured by merely changing the processing routine. Similar changes can be made to overcome a problem caused by the complete failure of one (or more) detectors in the array. In this regard, it might be advisable to have redundant detectors in the array to enable a sufficiently dense spatial sampling to be made (according to Linden, supra.) even assuming the failure of one or more randomly located detectors.

From the foregoing it will be apparent that spectrally distributed radiation incident on the split aperture can be dissected into spatial wavelength bands. The periodic phase variation introduced in the relay optics produces a diffraction pattern changing as a function of location (in the focal plane) and time (or phase adjustment). These time variations of the diffraction pattern can be separated into several frequency components where each corresponds to a multiple of the frequency of phase adjustment. The multiple is in turn dependent on the spatial frequency of the incident radiation. In this fashion, the apparatus "encodes" the spectral information so that it can be separately detected and allow this added information to be used to enable (a) spectral resolution, (b) enhanced spatial resolution, or a mix of these functions.

In the embodiments disclosed herein, the split apertures are composed of pairs of symmetrically located aperture elements. Those skilled in the art will understand that, while such arrangement reduces the computational complexity of determining various parameters it is not essential to the invention. Thus, although preferable that the split aperture be composed of pairs of symmetrically disposed aperture elements, such is not a requirement of the invention.

What is claimed is:

1. A split aperture radiation sensor having an entrance aperture of area A comprising at least two apertures separated by a distance B,
   a detector array comprising plural transducers arranged to receive focused radiation from said entrance aperture,
   relay means located between said entrance aperture and said detector array for redirecting and focusing radiation received within said entrance area A onto said detector array,
   wherein the improvement comprises,
   phase adjusting means included in said relay means for adjusting the phasing of radiation traversing said relay means from said split aperture as a function of time to produce a time varying diffraction pattern at said detector array, said time varying diffraction pattern having frequency components related to spatial frequencies of radiation incident on said split aperture.

2. The apparatus of claim 1 wherein said phase adjusting means varies the path length from an entrance aperture to said detector array to thereby adjust the phase of radiation reaching said detector array from said entrance aperture.

3. The apparatus of claim 2 wherein said path length is varied cyclically between maximum and minimum limits at a fixed rate.

4. The apparatus of claim 1 wherein said entrance aperture comprises plural, separated elements arranged symmetrically with respect to an axis providing pairs of associated entrance aperture elements and wherein a phase adjusting means correspondingly adjusts the path lengths from said elements to said detector array.

5. The apparatus of claim 4 wherein said phase adjustment means differentially adjusts path lengths from pairs of entrance aperture elements.

6. The apparatus of claim 5 wherein said phase adjustment means comprises a mirror capable of movement to thereby change the path length from entrance aperture to detector array.

7. The apparatus of claim 5 wherein said phase adjustment means comprises a doubly silvered mirror in the optical path from both of a pair of entrance aperture elements, movement of said mirror increasing the path length for one element to said detector array and correspondingly decreasing the optical path length from the other aperture element of said pair to said detector array.

8. The apparatus of claim 1 wherein said phase adjustment means comprises a mirror in an optical path between said entrance aperture and said detector array, said mirror producing phase adjustment by movement thereof to thereby change the optical path length from entrance aperture to detector array.

9. The apparatus of claim 1 in which said phase adjustment means cyclically adjusts the phasing of radiation traversing said relay means at a fixed rate to thereby encode different spatial frequency components of incident radiation into different frequency components of said diffraction pattern.

10. The apparatus of claim 1 wherein said detector array comprises a plurality of separated detectors in an incompletely filled array.

11. The apparatus of claim 10 wherein said separated detectors are located in said array in a regular order, and at least some of said detectors are separated by equal distances.

12. The apparatus of claim 1 which further includes processing means responsive to said detector array for producing data corresponding to an image having resolution greater than that associated with said aperture of area A.

13. The apparatus of claim 1 which further includes: processing means responsive to said detector array for producing image data in different arrays corresponding to different frequency components of said diffraction pattern to thereby enhance spectral resolution of said sensor.

14. The apparatus of claim 1 which further includes:
a processing means including
sampling means for sampling said detector array,
means for Fourier transforming said samples into plural Fourier array components,
gain adjusting means for adjusting the relative amplitude of each of said Fourier arrays, and
co-adding means for co-adding said gain adjusted Fourier arrays to produce a composite array.

15. The apparatus of claim 14 in which said gain adjusting means employs gain factors and in which said processing means includes means for providing said gain factors enhance desired features of said composite array.

16. The apparatus of claim 14 which further includes display means responsive to said composite array.

17. The apparatus of claim 14 which includes
means for storing a target array,
means for comparing said composite array and said target array, and
alarm means energized by said last named means if said composite and target array compare to within predetermined limits.

18. The apparatus of claim 1 further including at least a further entrance aperture of area C to
provide at least first and second entrance apertures,
field limiting means to limit the field of views of each of said apertures to be exclusive of the field of view of the other aperture, and
second relay means associated with said second aperture for redirecting and focusing radiation received within said second aperture onto said detector array, said second relay means including second phase adjusting means, said second phase adjusting means providing a second diffraction pattern having frequency components distinctively different from that comprising the diffraction pattern of said first aperture.

19. The apparatus of claim 18 wherein said
phase adjusting means varies the path lengths between said first aperture and said detector array at a first frequency,
said second phase adjusting means varying the path lengths between said second aperture and said detector array at a second frequency.

20. A split aperture radiation sensor of aperture area A distributed in a larger area B wherein the aperture area A is separated into pairs of aperture elements which are capable of angular resolution exceeding that associated with the aperture area A and approaching that associated with the area B, said sensor further comprising,
an array of detectors,
relay means for redirecting and focusing radiation received at said split aperture onto said detector array, said relay means including phase means for varying paths lengths as a function of time from aperture elements to the detector array to produce a time varying diffraction pattern at said detector array having frequency components related to plural spatial frequencies of radiation incident on said aperture area.

21. The apparatus of claim 20 wherein said phase means includes means in each optical path between an aperture element and said detector array.

22. The apparatus of claim 21 wherein said phase means includes a doubly silvered mirror associated with each separate pair of aperture elements.

23. The apparatus of claim 20 wherein said phase means comprises a plurality of mirrors, one for each aperture element, and means for driving the mirrors associated with each pair of aperture elements in phase opposition.

24. The apparatus of claim 20 wherein said detector array comprises a plurality of separated detectors located in an incompletely filled array.

25. The apparatus of claim 24 wherein said separated detectors are located in said array in a regular order, and at least some of said detectors are separated by equal distances.

26. The apparatus of claim 20 which further includes processing means responsive to said detector array for producing data corresponding to an image having resolution greater than that associated with said aperture of area A.

27. The apparatus of claim 20 which further includes,
a processing means including
sampling means for sampling said detector array,
means for Fourier transforming said samples into plural Fourier arrays,
gain means for gain adjusting said Fourier arrays, and
means for co-adding said gain adjusted Fourier arrays to produce a composite array.

28. The apparatus of claim 27 which further includes display means responsive to said composite array.

29. The apparatus of claim 27 which includes
means for storing a target array,
means for comparing said composite array and said target array, and
alarm means energized by said last named means if said composite and target array compare to within predetermined limits.

30. The apparatus of claim 20 wherein said phase means cyclically adjusts path lengths at a fixed rate to produce a diffraction pattern comprised of plural frequency components each equal to a given multiple of said fixed rate wherein the given multiple is related to the spatial frequency of radiation resulting in said frequency component of said diffraction pattern.

31. A method of increasing the angular resolution of a radiation sensor of given aperture area A comprising the steps of:
separating said aperture area A into plural distinct aperture elements separated by distances devoid of aperture elements,
providing a detector array,
providing relay optics for redirecting and focusing radiation received within said aperture elements onto said detector array,
providing phase adjustment means in said relay optics to produce, at said detector array, a time varying diffraction pattern having frequency components related to the spatial frequency of radiation incident on said aperture area,
operating said phase adjustment means to cyclically adjust the phase of radiation between maximum and minimum limits,
sampling said array as a function of phase adjustment to provide separate sampled arrays, and
processing said sampled arrays produced by said sampling to increase the angular resolution of said detector.

32. The method of claim 31 in which said processing step includes the steps of,
separately Fourier transforming each sampled array,
modifying each transformed array by a suitable gain factor, and,
co-adding all said modified transformed arrays.

* * * * *